United States Patent [19]

Ekstrom et al.

[11] Patent Number: 4,819,249

[45] Date of Patent: Apr. 4, 1989

[54] DEVICE FOR DETERMINING THE ACCURACY OF A THERMALLY-ACTIVATED INSTRUMENT

[76] Inventors: Regner A. Ekstrom, 15555 Millard Ave., Markham, Ill. 60426; Ronald E. Ekstrom, 4326 Applewood La., Matteson, Ill. 60443; Walter E. Ekstrom, R.R. No. 3, Kings Rd. Box 1195, Crete, Ill. 60417; Allan D. Ekstrom, 207 Corinth Dr., Olympia Fields, Ill. 60461

[21] Appl. No.: 946,942

[22] Filed: Dec. 29, 1986

[51] Int. Cl.$^4$ ............................................. G01K 15/00
[52] U.S. Cl. ........................................ 374/1; 219/209; 219/385; 219/521
[58] Field of Search ......................................... 374/1-3, 374/208, 210; 219/209, 385, 386, 521, 535

[56] References Cited

U.S. PATENT DOCUMENTS

| | | | |
|---|---|---|---|
| 2,854,844 | 10/1958 | Howell | 374/1 |
| 3,738,174 | 6/1973 | Waldron | 374/1 |
| 4,075,882 | 2/1978 | Waldron | 374/1 |
| 4,198,849 | 4/1980 | Siess et al. | 374/1 |
| 4,529,869 | 7/1985 | Ekstrom, Jr. | 219/535 |
| 4,643,586 | 2/1987 | Hansen | 374/1 |

FOREIGN PATENT DOCUMENTS 646504 5/1937 Fed. Rep. of Germany ...... 219/521

332338 3/1972 U.S.S.R. ................................ 374/1

Primary Examiner—William A. Cuchlinski, Jr.
Assistant Examiner—W. Morris Worth
Attorney, Agent, or Firm—Lee & Smith

[57] ABSTRACT

A test device for a thermally-activated instrument so that the accuracy of the instrument can be determined. In a first form of the invention, a cylindrical enclosure is provided for retaining the instrument and is connected to a power supply via terminals attached to the enclosure. The enclosure is slotted along its length to permit enlargement of the enclosure when necessary. A second enclosure, also slotted along its length and with a temperature sensing thermocouple attached thereto, is provided for retaining the thermally-activated instrument and is shaped to fit within the first enclosure. In a second form, a series of clustered enclosures are provided, with the enclosures being of varying sizes to accommodate thermally-activated instruments of various sizes. In a third form, enclosures are grouped into at least two separate groups, with the groups being capable of being electrically interconnected. In a fourth form, a conductive target is connected for heating within an enclosure, the target being mounted in registration with an opening in the enclosure so that the target can be aligned with an instrument situated some distance from the enclosure.

15 Claims, 3 Drawing Sheets

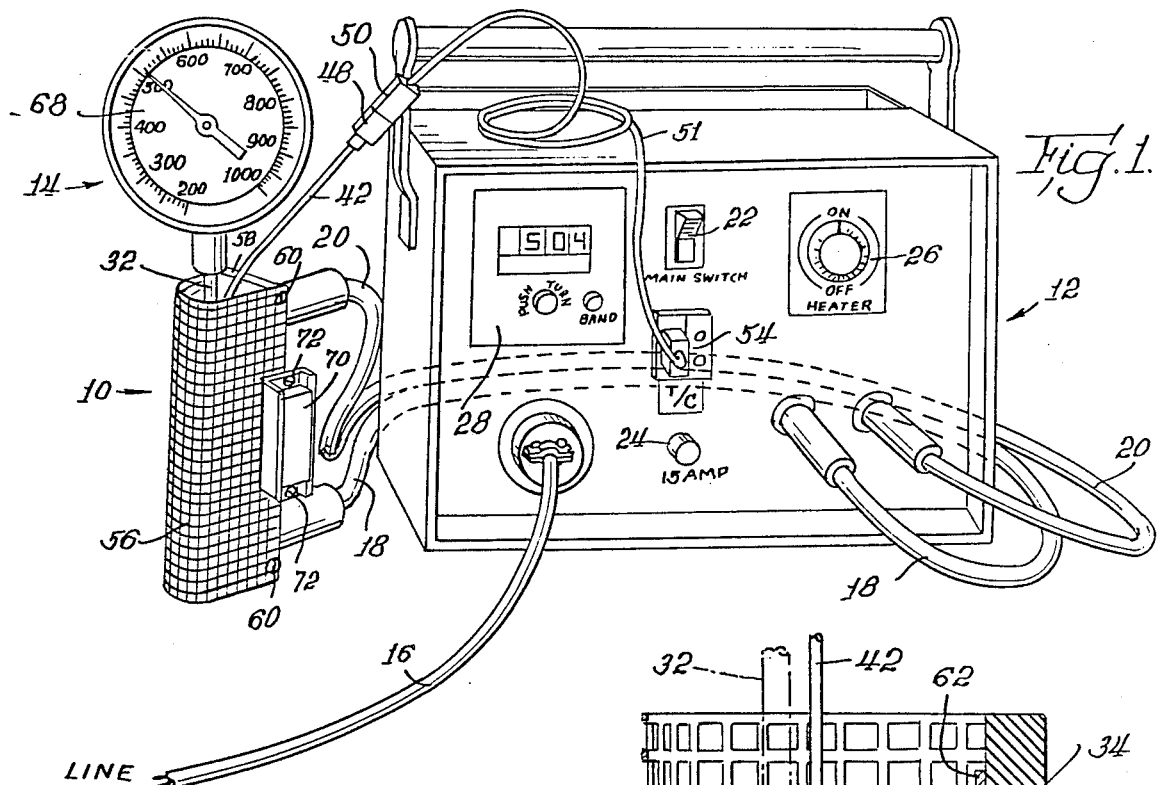
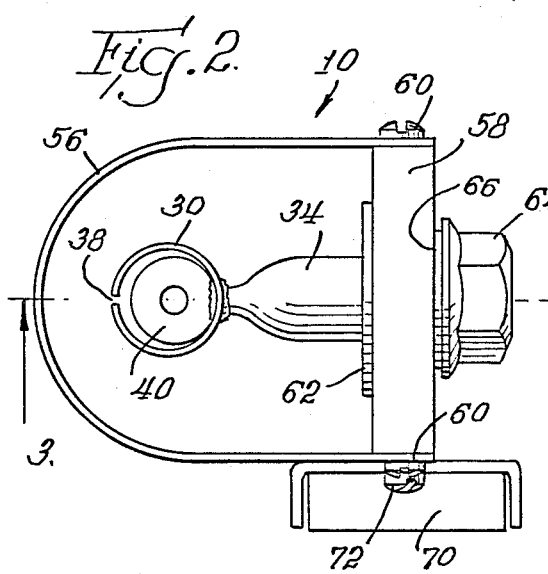
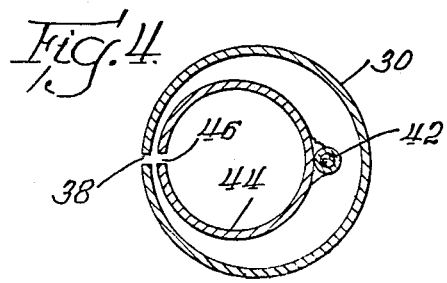
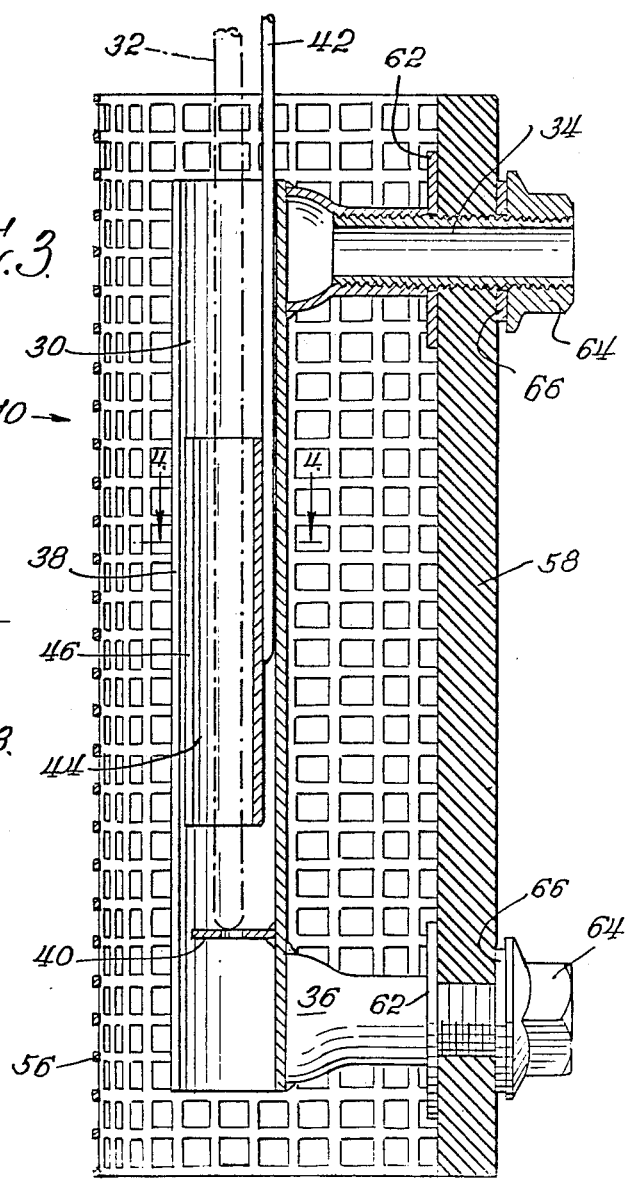

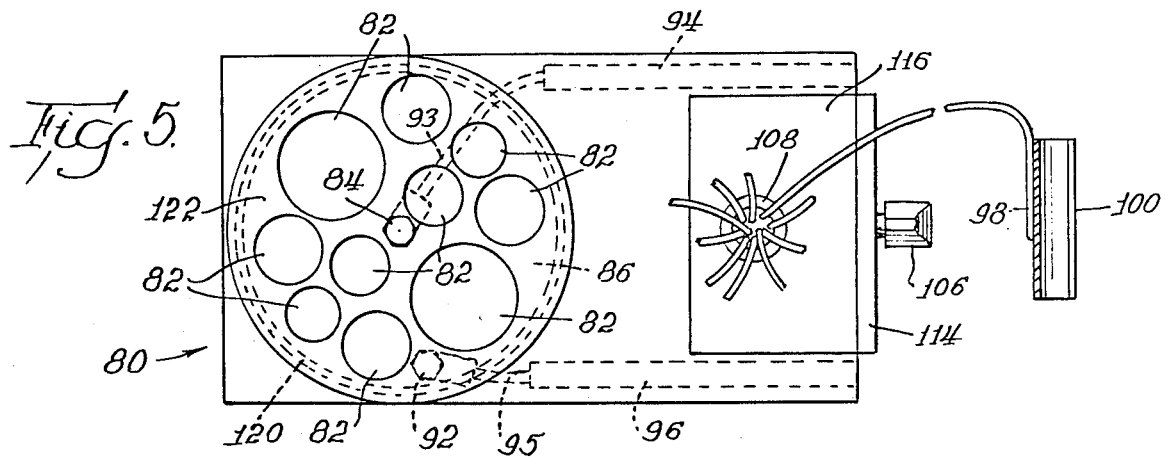
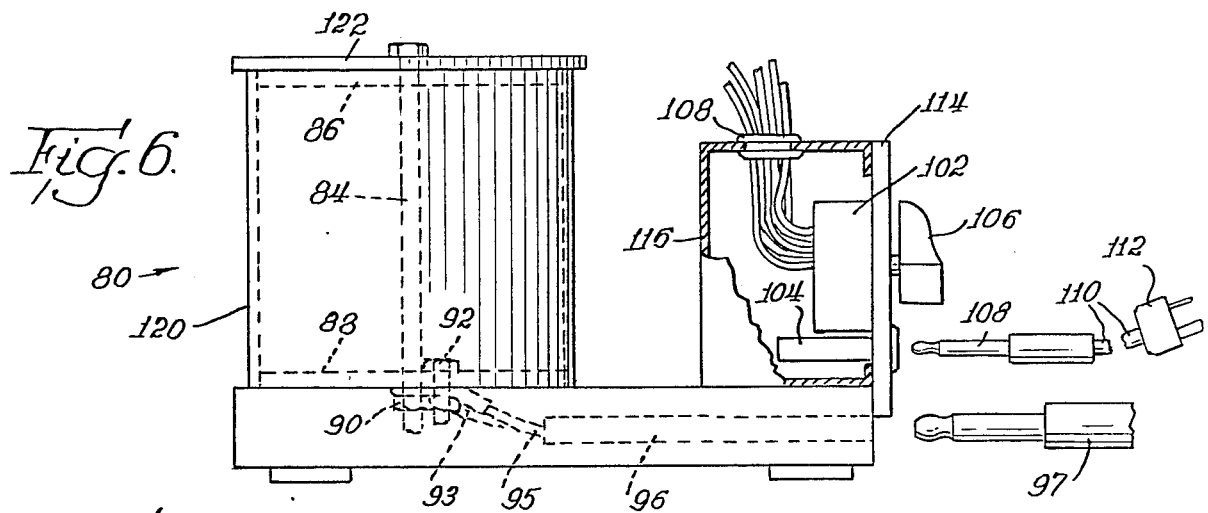
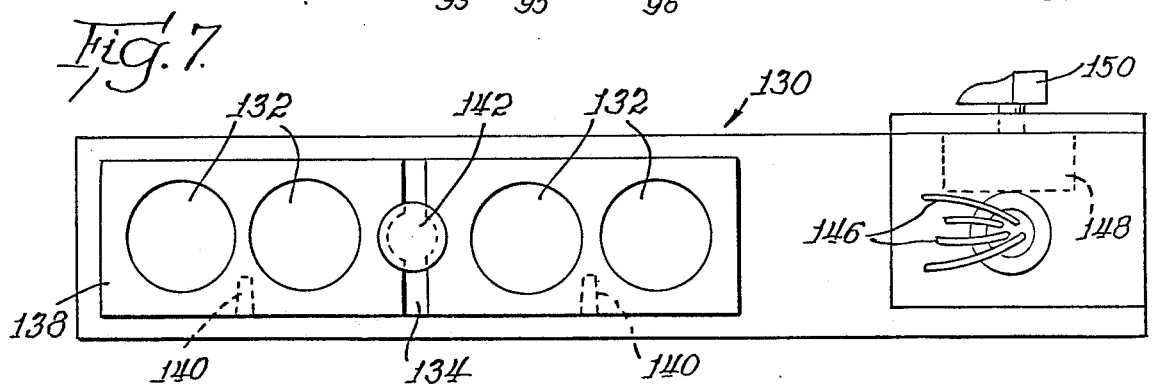
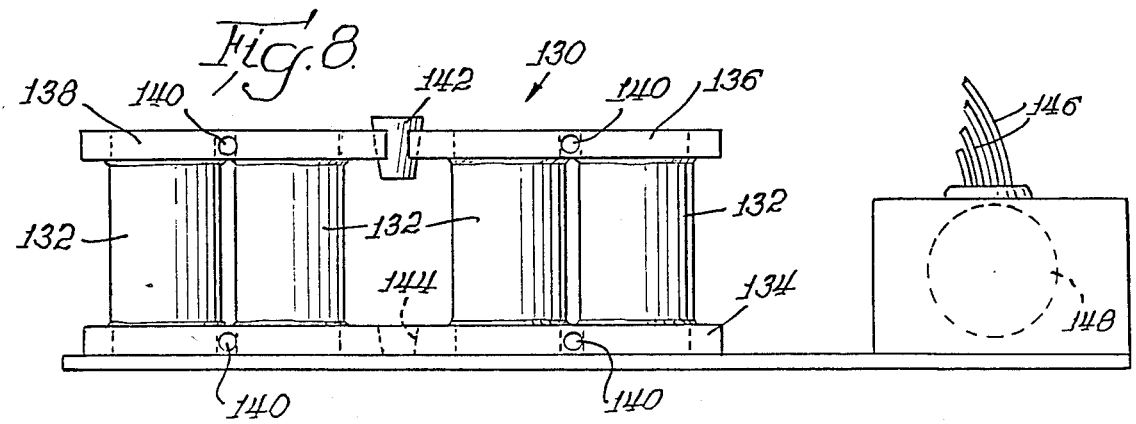

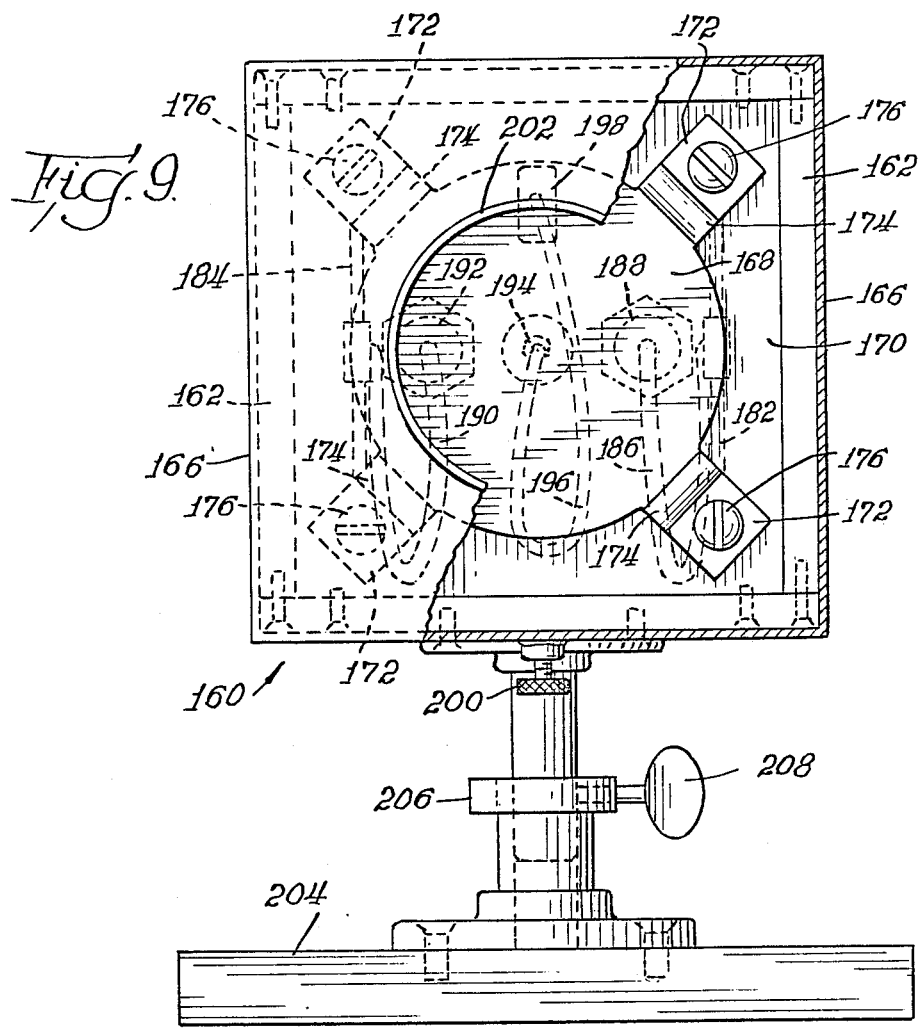
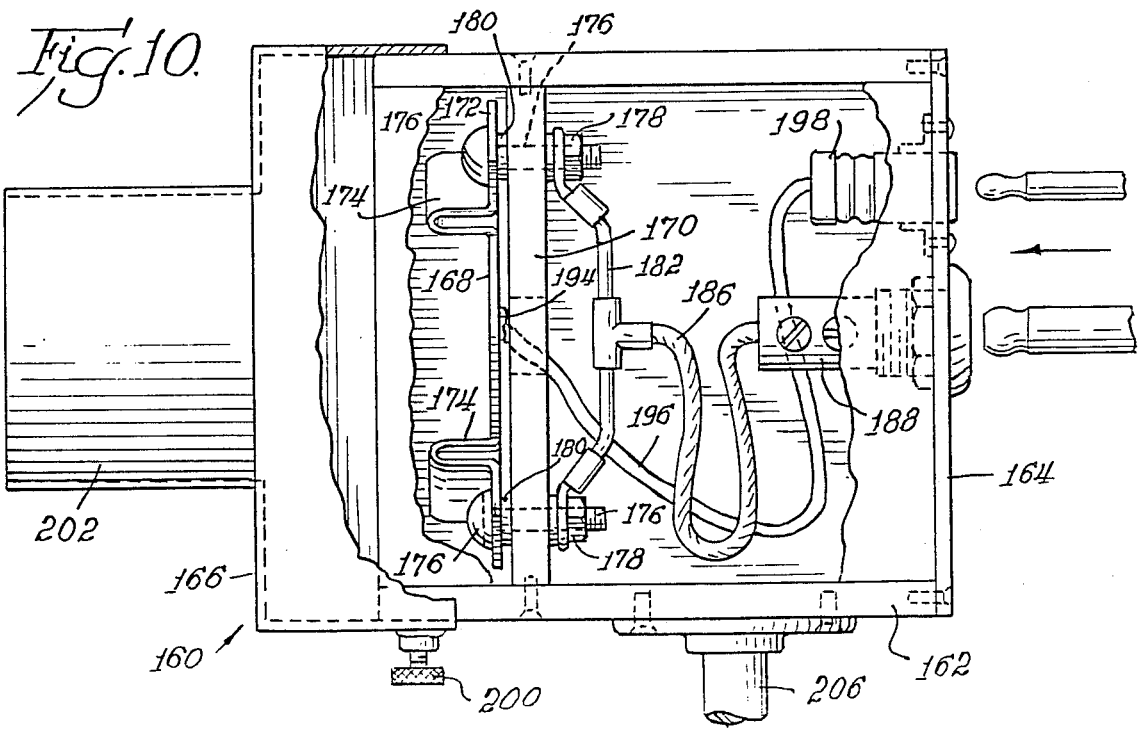

DEVICE FOR DETERMINING THE ACCURACY OF A THERMALLY-ACTIVATED INSTRUMENT

BACKGROUND OF THE INVENTION

This invention relates to temperature measuring instruments, and in particular to an apparatus for inducing heat into a test device so that the accuracy of a thermally-activated instrument can be determined.

U.S. Pat. No. 4,529,869 in the name of one of the inventors of this application relates to an apparatus of much the same character as this invention. In that patent, several embodiments of a device for inducing heat into an instrument such as a thermometer bulb, a temperature probe, thermocouples, or any other type of instrument are disclosed. While the invention of the patent functions well under most operating conditions, because the thermocouple sensor is fixed in place usually inside a heated enclosure, highly accurate temperature readings are sometimes difficult to obtain, particularly if the instrument being heated is small so that the thermocouple sensor is not in direct contact with the instrument. If the thermocouple is not fixed in place, but rather loose, inaccuracies can also be introduced because of improper positioning of the thermocouple.

SUMMARY OF THE INVENTION

The invention is intended to be an improvement over that of U.S. Pat. No. 4,529,869. It comprises an apparatus for inducing heat into a test device so that the accuracy of a thermally-activated instrument can be determined. It includes an enclosure for retaining the instrument, with the enclosure being hollow and generally cylindrical in configuration and having a length sufficient to accommodate at least a portion of the instrument within the enclosure. Terminals are connected to the enclosure and are adapted to be connected to a power supply for supply of heating current to the enclosure. In one form of the invention, a slot in the enclosure extends the length thereof for permitting enlargement of the enclosure by opening it at the slot. Temperature sensing means is provided for sensing the temperature of the instrument, with the temperature sensing means being adjacent the instrument when within the enclosure.

If the enclosure is mounted vertically, in accordance with the first embodiment of the invention, a stop is provided within the enclosure to permit insertion of the instrument to only a predetermined depth. The stop is located adjacent the lower end of the enclosure when installed in the vertical orientation.

Because the enclosure is heated to elevated temperatures, sometimes approaching 2,000° F., in the first form of the invention a shield is provided surrounding the enclosure. The shield is spaced from the enclosure by securing the shield to the mounting for the terminals connected to the enclosure. A magnetic mount is provided on the shield for mounting the shield and the enclosure on a ferrous surface.

In order to ensure accurate temperature readings, in the first form of the invention a second enclosure is provided for retaining the instrument. The second enclsure is, like the first enclosure, generally cylindrical in configuration and is shaped to fit within the first enclosure. For the purpose of equalizing the temperature of the instrument, the temperature sensing means is secured to the second enclosure, preferably by brazing or welding to the exterior of the second enclosure. The second enclosure also includes a longitudinal slot which extends the length thereof in order to permit expansion of the interior dimension of the enclosure.

In a second form of the invention, a plurality of enclosures are provided, with the electrical terminals being connected to the enclosures in order to supply heating current to the enclosures. In this form of the invention, the enclosures are either clustered or are grouped in at least two separate groups. If clustered, the cluster includes common conductive headers at opposite ends of the enclosures with the electrical terminals being connected to the headers. If provided in separate groups, headers are also provided, and in addition a removable metal connector is included for joining adjacent groups. Preferably the metal connector comprises a plug located in a seat formed in the adjacent groups.

In either form of the second embodiment of the invention, a plurality of the temperature sensing means is provided, with each temperature sensing means being secured to a separate enclosure. Each enclosure is generally cylindrical in configuration and is shaped to be fitted within one of the grouped instrument-carrying enclosures. Each of the temperature sensors is connected to a selector switch, with the switch being capable of separately selecting a single sensing means at a time for display of the temperature detected by that sensing means.

In a final form of the invention, the test device includes an enclosure which contains a conductive target. The target is mounted within the enclosure in registration with an opening therein. Electrical terminals are connected to the target and are adapted to be connected to a power supply for providing heating current to the target. A temperature sensor is secured to the target for sensing the temperature of the target.

In this form of the invention, a cover is mounted on the enclosure at the opening, and includes a hollow extension in registration with the target. The cover is laterally adjustable on the enclosure as desired.

In order to provide for expansion of the target, the target is secured to the enclosure by means of a plurality of extended ears protruding radially from the target. Integral heat expansion loops are used to mount the target to the ears. In accordance to the illustrated embodiment, the heat expansion loops comprise a recurved integral metal construction between the target and each of the ears.

BRIEF DESCRIPTION OF THE DRAWINGS

The invention is described in greater detail in the following description of an example embodying the best mode of the invention, taken in conjunction with the drawing figures, in which:

FIG. 1 is a perspective view of a first form of the apparatus according to the invention shown in use with its associated power supply, FIG. 2 is an enlarged top plan view of the first form of invention, without the second enclosure, FIG. 3 is an elevational, cross-sectional illustration taken along lines 3—3 of FIG. 2, FIG. 4 is a further enlarged cross-sectional illustration taken along line 4—4 of FIG. 3, FIG. 5 is a top plan view of a second form of the invention in which the enclosures are clustered, FIG. 6 is a side elevational view of the form of the invention shown in FIG. 5, FIG. 7 is a top plan view of a third form of the invention illustrating collection of the enclosures in separate groups, FIG. 8 is a front elevational view of the embodiment of FIG. 7, FIG. 9 is an elevational view of a fourth form of the invention having a heated target, and FIG. 10 is a side elevational view of the embodiment of FIG. 9, with the side plate removed for illustration purposes.

DESCRIPTION OF EXAMPLES EMBODYING THE BEST MODE OF THE INVENTION

One form of the apparatus according to the invention is shown generally at 10 in FIGS. 1 through 5. In FIG. 1, the apparatus 10 is shown in conjunction with its required power supply 12. Also shown in FIG. 1 is an instrument 14 in the form of a temperature probe whose accuracy is to be determined by the invention. While the power supply 12 forms no part of the claimed invention, a brief description of the power supply 12 illustrated will detail the type of power supply necessary for use in conjunction with the apparatus 10.

The power supply 12 is intended to perform two basic functions. First, it is intended to provide sufficient current for heating of the apparatus 10. Second, it provides a display of the temperature reached within the apparatus 10.

Power is provided to the power supply 12 via a line 16. Heating current to the apparatus 10 is provided by cables 18 and 20, as shown. Internally, the power supply circuit can be any conventional circuit for providing sufficient current to the apparatus 10, such as the circuit shown and described in U.S. Pat. No. 4,529,869.

The power supply 12 is provided with a main power switch 22, a common overload protection fuse 24, and a rotary switch 26 for controlling conduction of heating current to the cables 18 and 20. A digital temperature display 28 indicates the temperature reached within the apparatus 10 as detected by the invention, as described following.

The apparatus 10 of the first form of the invention includes an enclosure 30 which, as shown in FIGS. 2 through 4, is an elongated, hollow, generally cylindrical receptacle which has a length sufficient to accommodate at least a portion of the probe element 32 of the temperature probe 14. Terminals 34 and 36 are connected to the enclosure 30 and preferably are formed so that male connectors (not illustrated) of the cables 18 and 20 can readily be inserted therewithin for providing necessary heating current to the enclosure 30.

As best shown in FIGS. 2 and 4, the enclosure 30 includes a slot 38 extending the length thereof. While normally the enclosure 30 is closed at the slot 38, the slot 38 does permit enlargement of the enclosure by opening at the slot 38 to accommodate larger than normal probe elements of a temperature probe or other element being tested.

The enclosure 30 is also provided with a stop 40 near one end thereof so that the probe element 32 can be inserted to a particular depth. When the apparatus 10 is employed in the vertical orientation shown, the stop 40 prevents the probe element 32 from improperly extending beyond the confines of the enclosure 30.

A temperature sensor 42 is employed to detect the temperature of the enclosure 30. While the temperature sensor can be inserted directly within the enclosure 30, it is preferred, for accuracy of measurement, that the temperature sensor be used in combination with a second enclosure 44 which, similar to the first enclosure 30, is composed of a hollow, generally cylindrical receptacle which is shaped to fit about the probe element 32 and which also is shaped to fit within the confines of the enclosure 30. Similar to the first enclosure, the second enclosure 44 includes a longitudinal slot 46 extending the length thereof so that, if necessary, the interior dimension of the second enclosure 44 can be enlarged by spreading the enclosure 44 at the slot 46.

A male plug 48 on the temperature sensor 42 is connected, in a normal fashion, to a receptacle 50 of an extension lead 51 which is connected to a receptacle 54 in the face of the power supply 12. The temperature detected by the temperature sensor 42 is indicated on the digital temperature display 28.

Because elevated temperatures are induced into the receptacle 30, a shield 56 is provided surrounding the receptacle 30. The shield 56 is attached to a mounting plate 58 through which the terminals 34 and 36 pass for connection to the power cables 18 and 20. Screws 60 are used to secure the shield 56 to the plate 58.

As shown in FIGS. 2 and 3, the terminals 34 and 36 also serve to space the shield 56 from the enclosure 30. Washers 62 are provided on the terminals 34 and 36, bearing against the interior face of the plate 58. The terminals 34 and 36 pass through apertures in the plate 58 and are capped by nuts 64 threadedly engaged on the terminals 34 and 36 and bearing against washers 66 which, in turn, bear against the outer face of the plate 58. Therefore, due to the respective lengths of the terminals 34 and 36, the enclosure 30 is located centrally within the shield 56.

Any type of temperature probe 14 or other temperature responsive instrument can be tested by the apparatus 10. Using the probe 14 as an example, when the probe element 32 is installed within the enclosure 30 and the enclosure is raised to the desired operating temperature, the temperature of the enclosure 30 is read on the digital temperature display 28 via the temperature sensor 42. Concurrently, the temperature indicated by the temperature probe 14 may be read from its temperature dial 68. The accuracy of the temperature probe 14 is determined by comparing the temperature indicated on the temperature dial 68 with that on the digital temperature display 28.

So that the apparatus 10 can be mounted on a ferrous surface, it is provided with a magnet 70 which is secured to the plate 58 by means of screws 72.

Because of the elevated temperatures which can be induced into the enclosure 30, preferably the enclosure is made of stainless steel, which can withstand the highest temperatures reasonably expected to be encountered. For proper distribution of heat, it is preferred that the second enclosure 44 be made of copper or a similar heat conducting metal. To ensure accurate temperature reading, it is preferred that the temperature sensor 42 be silver-soldered to the second enclosure 44.

A second form of the apparatus according to the invention is shown generally at 80 in FIGS. 5 and 6. The apparatus 80 includes a series of enclosures 82 which are grouped or clustered about a central terminal stud 84. As best shown in FIG. 6, the stud 84 extends between an upper header 86 and a lower plate or header 88, the headers 86 and 88 innerconnecting the enclosures 82 at the opposite ends thereof. The stud 84 is connected to the header 86 and extends through an aperture in the header 88 to a terminal 90. The stud 84 is electrically isolated from the header 88 so that current may pass therethrough only the header 86.

The header 88 includes a terminal 92 secured thereto and passing through an aperture therein. Both the terminals 90 and 92 are connected to separate electrical leads which extend from the apparatus 80. As shown in FIGS. 5 and 6, the terminal 90 is connected to a lead 93 connected to a socket 94 and adapted to be joined to a cable (not illustrated) leading from the apparatus 80. The terminal 92 is similarly connected to a separate lead 95 and socket 96 which is adapted to be connected to a cable 97. Preferably, the cables leading from the terminals 90 and 92 are connected to a power supply, such as the power supply 12 illustrated in FIG. 1. The cable 97 and that for the socket 94 would be connected to the power supply 12 in place of the cables 18 and 20 of FIG. 1.

The enclosures 82 may be of any desired size, with three different sizes being illustrated in FIG. 5. Similar to the form of the invention described above with regard to FIGS. 1 through 4, the embodiment of the invention of FIGS. 5 and 6 includes a temperature sensor 98 for each of the enclosures 82. The sensors 98 are each secured to an enclosure 100 (one illustrated) which, in a fashion similar to the enclosures 44 of FIGS. 1 through 4, is composed of a hollow, generally cylindrical receptacle which is shaped to fit within the confines of the enclosures 82. Each of the temperature sensors 98 leads to a multi position switch 102. As is conventional, the switch 102 includes a separate contact position for each of the sensors 98. The switch includes a double common terminal secured to a jack 104. By rotation of a switch dial 106, one of the temperature sensors 98 can be electrically connected at a time to the jack 104. A plug 108 is provided for connection internally within the jack 104. A cable 110 is secured to the plug 108 and extends to a male plug 112, which, preferably, is identical to the plug 48 of FIG. 1 so that the plug 112 may be plugged into the receptacle 50 of the extension lead 51 connected to the receptacle 54 in the face of the power supply 12. Thus, by judicious rotation of the dial 106 of the switch 102, the temperature detected by each of the temperature sensors 98 can be displayed on the digital temperature display 28.

For purposes of protection, the switch 102 is mounted on a panel 114 and is enclosed by a housing 116. Wires for the temperature sensors 118 extend through a grommet 118 in the housing 116. The clustered enclosures 82 may also be mounted within a non-conductive housing 120 having a top cap 122.

A third form of the apparatus according to the invention is shown generally at 130 in FIGS. 7 and 8. In this form of the invention, a series of enclosures 132 are seated within a bottom header 134, with half of the enclosures 132 being caped by a top header 136 and the other half of the enclosure 132 being capped by a top header 138. The headers 134 through 138 include a series of tapered receptacles 140 shaped to accomodate the male plugs of power cables, such as the cables 18 and 20 of FIG. 1.

The enclosures 132 are grouped in two groups, the first group being that connected by the header 136 and the second group being that connected by the header 138. As shown, the headers 136 and 138 are not connected, therefore permitting one of the groups of the enclosures 132 to be heated without energizing the second group. However, if all of the enclosures 132 are to be heated, the headers 136 and 138 may be joined by means of a movable metal connector in the form of a plug 142. The plug 142, when connecting the headers 136 and 138, is located in a seat formed in the adjacent headers 136 and 138. When not in use, the plug 142 may be removed and stored within a storage notch 144 formed in the bottom header 134.

In a fashion identical to the embodiment of FIGS. 5 and 6, the embodiment of FIGS. 7 and 8 includes a separate temperature sensor (not illustrated), connected to a second enclosure (also not illustated), for each of the enclosures 132. Each of the temperature sensors is connected to a separate lead 146 connected to a multi position switch 148. A dial 150 of the switch 148 is used to select the particular temperature sensor with the temperature data being transmitted to the temperature display 28 in a fashion identical to that described above with respect to FIGS. 5 and 6. For the purposes of simplicity, the necessary connection jack, plug and leads to the power supply 12 have been omitted.

FIGS. 9 and 10 depict a final form of the apparatus according to the invention which is designated generally at 160. In this form of the invention, the apparatus 160 includes a four-sided enclosure 162 having a fixed end plate 164 at one end and a movable cover 166 at the opposite end. Within the enclosure 162 is situated a metallic target 168 located adjacent to an internal support plate 170 appropriately secured to the walls of the enclosure 162. The target 168 is mounted on the support plate 170 by means of four ears 172 extending radially therefrom. At its point of junction with the target 168, each of the ears 172 includes a recurved metal connection or loop 174 between the target and the ear which will accomodate relative expansion between the target 168 and the ears 172 during heating. The target 168 is secured to the support plate 170 by means of four bolts 176 passing through the ears 172 and being secured to the plate 170 by means of appropriate nuts 178. A spacer 180 is included between each of the ears 172 and the plate 170 to assure appropriate separation of the target 168 from the plate 170.

For supply of heating current to the plate 170, conductors 182 and 184 are secured to appropriate bolts 176 on opposite sides thereof. A conductor 186 is secured to the conductor 182 and leads to a jack 188 passing through the end plate 164, and, identically a conductor 190 is secured to the conductor 184 and is secured to a jack 192 mounted within the end plate 164. Thus, by connection of an appropriate power source, such as the power supply 12 connected by means of the cables 18 and 20 to the jacks 188 and 192, heating current can be supplied to the metallic target 168.

To detect the temperature of the target 168, a thermocouple 194 is welded to the center thereof. Leads 196 to the thermocouple 194 pass through a aperture in the support plate 170 and are connected to a jack 198 also secured in the end plate 164. In the same manner as illustrated with respect to FIGS. 5 and 6, a thermocouple plug, such as plug 108 illustrated in those drawing figures, can be connected to the jack 198 with resultant temperature readings appearing on the digital temperature display 28 of the power supply 12.

The cover 166 is closely fitted about the enclosure 162 but it movable thereon (to the left or right in FIG. 1) as desired. A thumb screw 200 is used to lock the cover 166 in place.

Extending outwardly from the cover 166 is a hollow extension 202. The extension 202 is secured to the cover 166 by appropriate means, such as welding or soldering, about an aperture in the cover 166 of approximately the same size as the internal diameter of the extension 202. The extension 202 can also be furnished with various internally tapered diameters to vary the target size for checking the field area of a heat detecting device, or a variable iris shutter can be used. Thus, the entire apparatus 160 may be "aimed" through the extension 202 toward a heat detecting device, such as an infrared pyrometer.

For mounting of the apparatus 160, included may be a stand 204 having a telescoping height-adjusting assembly 206 which is secured to the underside of the enclosure 162. By means of a thumb screw 208, the enclosure 162 can be retained temporarily in place.

The apparatus 160 of FIGS. 9 and 10 is used to calibrate instruments, such as an infrared pyrometer, which are not directly heated by the apparatus 160. Rather, the enclosure 162 is directed toward the instrument to be calibrated with the extension 202 aimed at the instrument so that the instrument is in direct alignment with the metallic target 168. The cover 166 is adjusted on the enclosure 162 to assure that any black body radiation or other spurious radiation from without does not cause false readings by reflection.

Various changes can be made to the invention without departing from the spirit thereof or scope of the following claims.

What is claimed is:

1. A test device for a thermally-activated instrument for determining the accuracy of the instrument, comprising
   (a) a first enclosure for retaining the instrument, said first enclosure being hollow and generally cylindrical in configuration and having a length sufficient to accommodate at least a portion of the instrument within the enclosure,
   (b) terminal means connected to said first enclosure and adapted to be connected to a power supply for supply of heating current to said first enclosure,
   (c) a second enclosure for retaining the instrument, said second enclosure being cylindrical in configuration and being shaped to fit within said first enclosure, said second enclosure having a length less than the length of said first enclosure so that said second enclosure may be positioned at random locations within said first enclosure with the instrument extending through said second enclosure, and
   (d) temperature sensing means for sensing the temperature of the instrument, said temperature sensing means being secured to said second enclosure and removable from said first enclosure with said second enclosure.

2. A device according to claim 1 including a stop within said first enclosure to permit insertion of the instrument to a predetermined depth.

3. A device according to claim 1 including slot means in said first enclosure extending the length thereof for permitting enlargement of said first enclosure by opening thereof at said slot means.

4. A device according to claim 1 including a shield surrounding said first enclosure, and including means spacing said shield from said first enclosure.

5. A device according to claim 4 including a magnetic mount secured to said shield for mounting said shield and first enclosure on a ferrous surface.

6. A device according to claim 1 in which said temperature sensing means is brazed to the exterior of said second enclosure.

7. A device according to claim 1 in which said second enclosure includes a longitudinal slot extending the length thereof.

8. A device according to claim 1 in which said second enclosure includes a longitudinal slot extending the length thereof and in which said temperature sensing means is secured to the exterior of said second enclosure opposite said longitudinal slot.

9. A device according to claim 1 including a plurality of first enclosures, said terminal means being connected to said enclosures for supply of heating current thereto.

10. A device according to claim 9 in which said first enclosures are grouped together, and including common header means at opposite ends of said enclosures, said terminal means being connected to said header means.

11. A device according to claim 9 including a plurality of said temperature sensing means, each temperature sensing means being secured to a separate movable second enclosure, each movable second enclosure being generally cylindrical in configuration and being shaped to fit within one of said first enclosures.

12. A device according to claim 11 in which each sensing means is connected to a selector switch, said switch including means for separately selecting one of said sensing means.

13. A device according to claim 9 in which said first enclosures are grouped together in at least two groups, and including means for joining said groups to permit flow of heating current between said groups.

14. A device according to claim 13 in which said joining means comprises a removable metal connector.

15. A device accoring to claim 14 including a separate header joining the first enclosures of each group, and in which said connector comprises a plug located in a seat formed in adjacent headers.

* * * * *